Dec. 8, 1953     L. G. ROLLINS     2,661,940
CUTTER CHAIN
Filed May 26, 1948     2 Sheets-Sheet 1
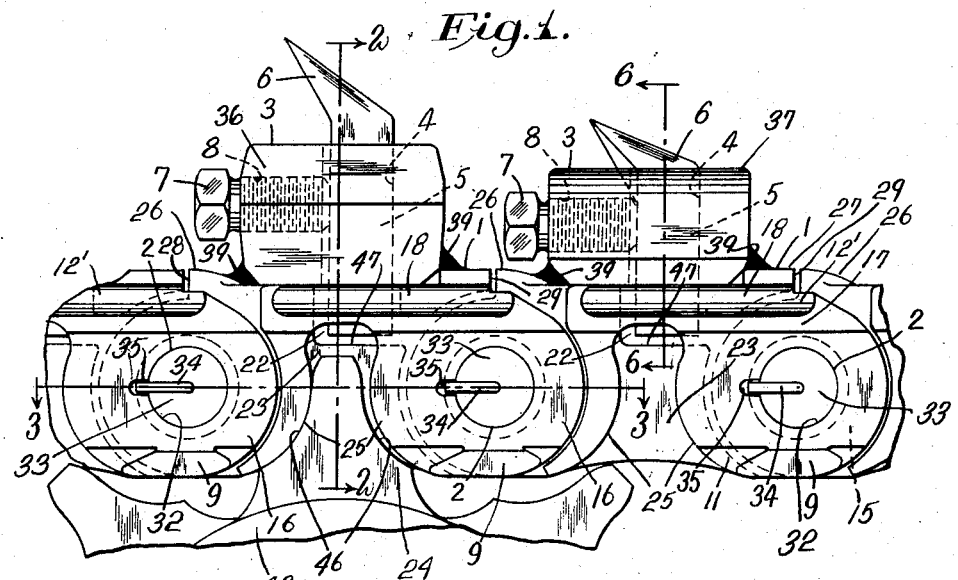
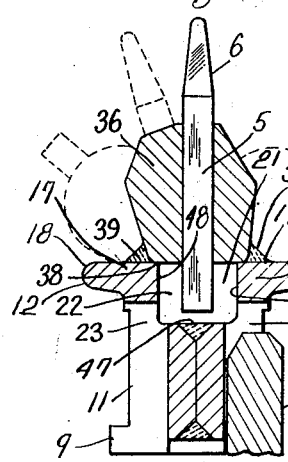
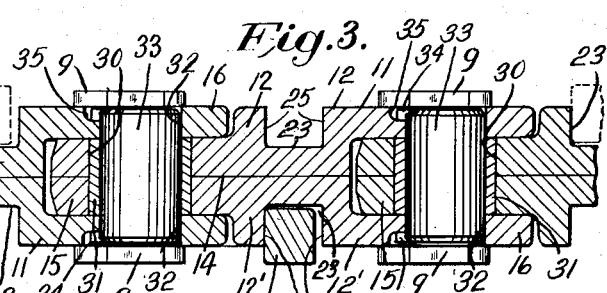
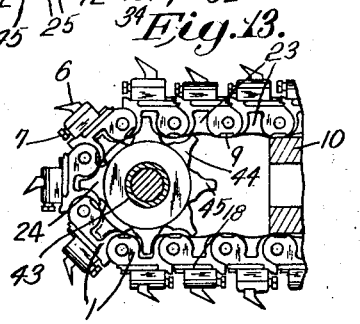
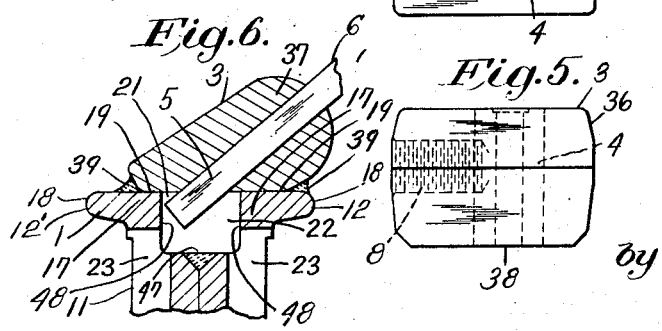
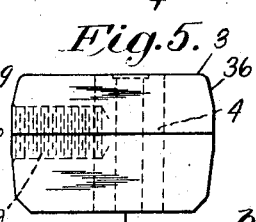
Inventor:
Lester G. Rollins.
by Charles F. Osgood,
Attorney.

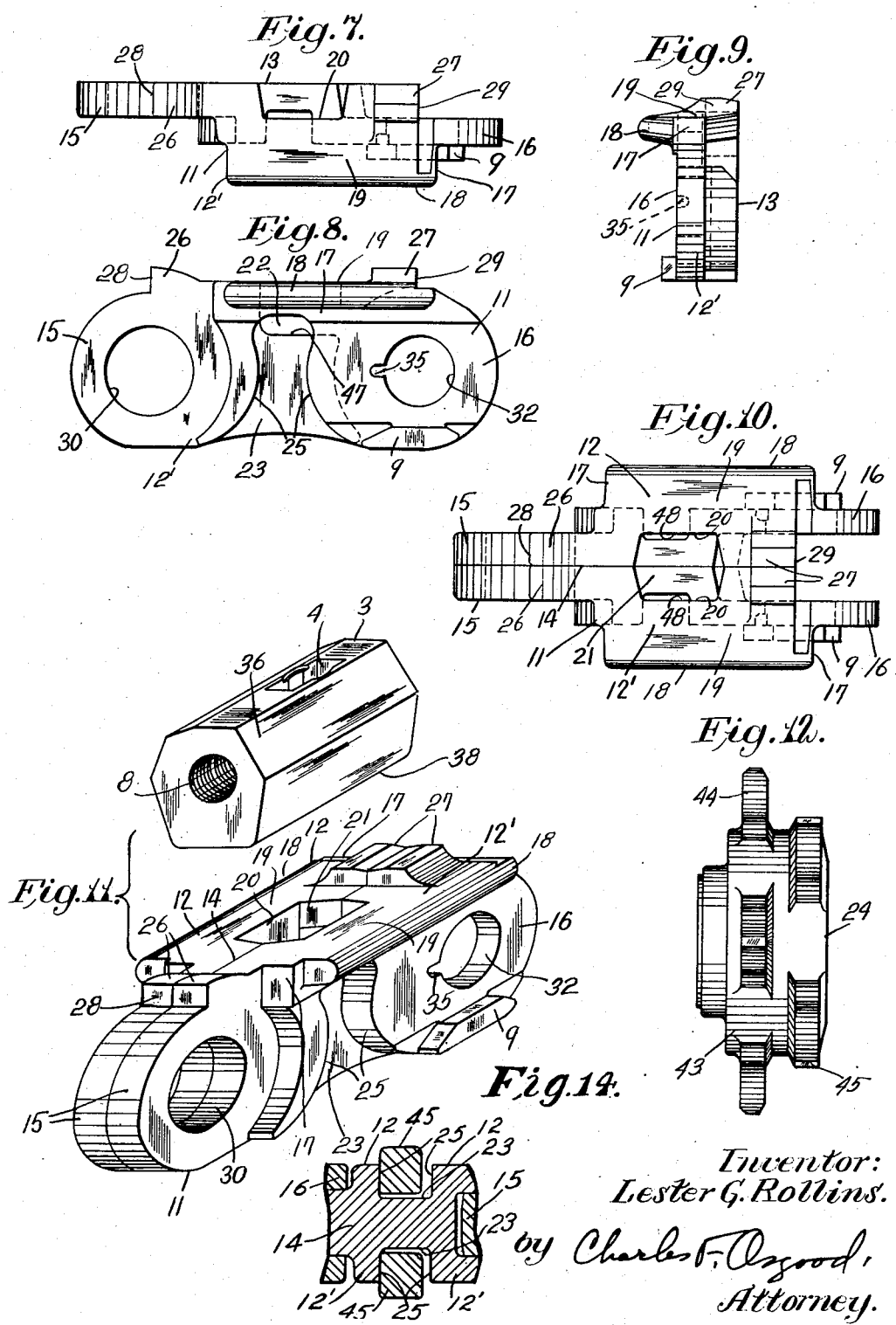

Patented Dec. 8, 1953

2,661,940

UNITED STATES PATENT OFFICE 2,661,940

CUTTER CHAIN

Lester G. Rollins, Meriden, N. H., assignor to Joy Manufacturing Company, Pittsburgh, Pa., a corporation of Pennsylvania Application May 26, 1948, Serial No. 29,322

5 Claims. (Cl. 262—33)

This invention relates to cutter chains and more particularly to a mining machine cutter chain so constructed as to increase strength, efficiency and durability.

In conventional cutter chains designed for use with coal cutting machines, the bit carrying blocks are usually pivotally connected together by intermediate strap links and the blocks have internal sprocket tooth-receiving pockets in their bases. Also, known types of cutter chains have the bit carrying blocks pivotally connected directly together and likewise have internal pockets in the block bases to receive the sprocket teeth. Such internal tooth-receiving pockets not only decrease the strength of the blocks but also have a tendency to pack with dirt. Moreover, in such known cutter chains, the tooth-receiving pockets usually communicate with the bit stop spaces within the blocks, thereby necessitating side openings in the blocks which further decrease the strength of the blocks. The present invention contemplates improvements over such known types of cutter chains in that the bit carrying blocks are pivotally connected directly together, with the sprocket tooth-receiving recesses formed at the sides of the block in such manner as to receive sprocket teeth which are arranged on the sprocket in parallel rows and in staggered relation so that one sprocket tooth engages a chain block at one side thereof and the next adjacent sprocket tooth engages the opposite side of the next adjacent block. By such an improved construction, it is possible to provide block bases of solid cross section, resulting in greater strength, and also, due to the driving of each chain block, a smoother running chain is provided, and buckling thereof is reduced, thus increasing the efficiency and life of the chain and reducing the power required to drive the chain. Moreover, the cutter chain of the present invention is made up of separate parts welded together in a novel manner, not only to provide greater strength and durability but also to maintain the cost of manufacture at a minimum. By the provision of the novel fabricated welded structure of each chain block, and the novel arrangement of the sprocket tooth-receiving recesses at the sides of each block, an improved bit stop is made possible, and by forming the bit stop spaces so that they communicate with the side tooth-receiving recesses, the possibility of packing with dirt is substantially reduced. Also, by forming the tooth-receiving recesses at the sides of the blocks, packing of the tooth spaces is avoided.

An object of the present invention is to provide an improved cutter chain constructed in a novel manner whereby the disadvantages of known types of cutter chains are substantially overcome. Another object is to provide an improved cutter chain which, due to its novel design, has relatively great strength and durability and which substantially increases cutting efficiency while decreasing the power required to drive the chain. A further object is to provide an improved cutter chain of a fabricated welded construction wherein each chain block is made up of several forged parts welded together in a novel manner. A still further object is to provide an improved cutter chain and drive sprocket therefor wherein the recesses for receiving the teeth of the sprocket are formed at the sides of the chain blocks, resulting in a block structure of increased strength and avoiding packing of the tooth-receiving recesses with dirt. Yet another object is to provide an improved cutter chain and chain drive sprocket construction wherein the chain blocks are pivotally connected directly together and have sprocket tooth-receiving recesses at the sides of each block, and the drive sprocket has parallel rows of teeth in staggered relation so that one tooth engages a chain block at one side thereof and the next adjacent tooth engages the opposite side of the next adjacent block. A still further object is to provide an improved cutter chain which is smooth running and wherein buckling is reduced, thus to increase efficiency and to reduce the power required in the drive thereof. Another object is to provide an improved chain block structure having an improved bit stop and wherein the bit stop space communicates with the side tooth-receiving recesses to avoid packing of the bit stop spaces with dirt. Still another object is to provide an improved cutter chain of fabricated welded construction of a novel design whereby relatively great strength and longer life are attained. These and other objects and advantages of the invention will, however, hereinafter more fully appear.

In the accompanying drawings there are shown for purposes of illustration one form and a modification which the invention may assume in practice.

In these drawings:

Fig. 1 is a fragmentary side elevational view of a cutter chain constructed in accordance with an illustrative embodiment of the invention, and showing a portion of the chain driving sprocket.

Fig. 2 is a cross-sectional view taken substantially on line 2—2 of Fig. 1.

Fig. 3 is a longitudinal horizontal section taken substantially on line 3—3 of Fig. 1.

Fig. 4 is a plan view of one of the block lugs.

Fig. 5 is a side view of the block lugs shown in Fig. 4.

Fig. 6 is a fragmentary cross-sectional view taken substantially on line 6—6 of Fig. 1, showing another block lug.

Fig. 7 is a top plan view of a half section or part of a block base.

Fig. 8 is a side view of the base part shown in Fig. 7.

Fig. 9 is an end view of the base section.

Fig. 10 is a top plan view of the block base, showing the complemental sections or parts welded together.

Fig. 11 is a perspective view showing the block lug and block base in separated relation prior to welding.

Fig. 12 is a side view, on a reduced scale, of the chain drive sprocket.

Fig. 13 is a fragmentary plan view, on a further reduced scale, showing the cutter chain, chain drive sprocket and cutter bar.

Fig. 14 is a fragmentary sectional view taken on the plane of Fig. 3, showing a modified construction.

In this illustrative construction, as shown in the drawings, the cutter chain generally comprises a series of chain blocks 1 pivotally connected directly together at 2. The chain blocks have lateral lugs 3 provided with openings 4 for receiving the shanks 5 of conventional single-pointed cutter bits 6. Set screws 7, threaded within openings 8 in the block lugs in advance of the lug openings, are engageable with the shanks for securing the bits in cutting position on the lugs. The blocks have lateral gibs 9 projecting from their sides at their bottoms for engagement with the guideway of a conventional cutter bar 10, in a well known manner.

The chain blocks are of an improved fabricated welded construction and each comprises a base portion 11 composed of half sections or complemental parts 12 and 12' of identical design, although one being a left hand part and the other a right hand part. Each base part has a lateral gib 9 formed thereon, as shown. The parts have inner plane surfaces 13 which are adapted to be placed together at the longitudinal median line of the block and are then welded at 14 to form a unitary block base. Each of the base parts 12, 12' has a front eye portion 15 at one end and a rear yoke portion 16 at the opposite end, as shown in Fig. 7, and formed integral with these eye and yoke portions is a horizontal upper shelflike portion 17 which projects outwardly from the outer surface of the central portion of the base part to provide a lateral reinforcing rib 18, as shown in Fig. 9. This horizontal portion 17 of each part 12, 12' has a plane upper surface 19, and the inner side of the upper horizontal portion 17 of each base part is recessed or notched at 20. Thus, when the complemental base parts are welded together, as shown in Fig. 10, a wide and elongated upper plane surface is provided, having a central opening 21 provided by the cooperating notches or recesses 20. The opening 21 provides a space 22 (Figs. 2 and 6) in which the inner ends of the shanks of the centrally located bits project, as later explained. The sides of the base parts are vertically recessed at 23, and these recesses cut into the space 22 so that the inner portion of the latter is open laterally through the recesses 23 at the opposite sides of the block base. The recesses 23 form lateral tooth-receiving pockets and are adapted to receive the teeth of a chain drive sprocket 24 to be later described, and the recesses have curved front and rear walls or surfaces 25 so that the sprocket teeth may smoothly enter the recesses during drive of the chain and engage the forward curved surfaces of the recesses to drive the chain in a forward direction. The front eye portion 15 of each base part has an upward projection 26, and the rear yoke portion 16 has an upstanding projection 27, and these front and rear projections, when the base parts are welded together, respectively cooperate to provide forwardly and rearwardly facing abutment surfaces 28 and 29. The eye portions 15 cooperate to provide a front eye of the block base, while the rear yoke portions 16 cooperate to provide the rear yoke of the base. The front eye has a transverse bore 30 which receives a bushing 31, and the yoke has alined smaller transverse bores 32 which receive the end portions of a hinge pin 33 which passes through the bushing. Conventional bent wire locks 34, passing through openings in the pins, have end portions bent into slots 35 in the outer sides of the yoke to lock the hinge pin against rotation relative to the block base. The block lugs are made in various shapes as by forging, and a central lug is shown at 36 in Figs. 1 and 2 and an outermost lug is shown at 37 in Figs. 1 and 6. In Figs. 4 and 5, the central lug 36 is shown in plan and in side elevation. There are three intermediate lugs (not shown) between the central lug 36 and the outermost lug 37 at each side of the median line of the chain and these lugs have the bit-receiving openings 4 arranged at different angles on different lugs, to provide for proper lacing of the cutter bits received in the openings. The lugs have inner plane surfaces 38 which are welded at 39 to the outer plane surfaces of the block bases. Certain of the lugs at one side of the block base are identical in external shape to the lugs at the other side but have the threaded openings 8 at the opposite end and are turned end for end so that the lugs are oppositely angularly disposed. Thus but three lug shapes are necessary, with proper location of the bit-receiving openings 4 and the set screw openings 8, to obtain nine bit positions.

It will be noted that the base parts of each block are joined by welding along a major portion of the length of the base to provide an extremely rugged structure, and the bit lugs are thereafter welded to the upper plane surfaces of the block bases. Thus, the block bases are integrally formed prior to the welding of the bit lugs thereto so that the bit lugs merely provide a bit support and do not serve to join the complemental parts of the block bases together.

As shown in Figs. 1, 12 and 13, the chain drive sprocket 24 has a hub 43 formed with parallel rows of sprocket teeth 44 and 45, and these rows of teeth are arranged in staggered relation so that when the cutter chain is driven, a sprocket tooth of one row enters a tooth-receiving recess 23 at one side of one chain block and the next adjacent sprocket tooth of the other row enters the tooth-receiving recess at the opposite side of the next adjacent block. The sprocket teeth at their opposite sides are curved at 46 so that as the chain is driven, the teeth smoothly enter the tooth-receiving recesses, with the forward curved surfaces of the teeth engaging the curved forward surfaces or walls 25 of the recesses. Intermediate the tooth-receiving recesses 23, there extends a horizontal portion of the block base which provides an upper abutment surface 47 located inwardly of the shelflike portions 17 and with which the inner ends of the shanks of the central bits are engageable to provide a stop, as shown in Fig. 2, and the side walls 48 of the opening 21 in the block base similarly provide stops for the inner ends of the shanks of the outermost inclined bits, as shown in Fig. 6. Any dirt which passes down through the lug openings into the bit stop spaces 22 is discharged laterally through the recesses 23, and packing of dirt in the tooth-receiving recesses 23 is likewise avoided since the recesses open laterally from the sides of the block bases.

In assembling the cutter chain, the front eye of each block is fitted in the rear yoke of the next adjacent block, and the eyes and yokes are pivotally connected together by the bushings 31 and hinge pins 33. The bent wire locks 34 are then placed in position in a conventional manner with their ends bent into the slots 35 in the sides of the block bases to hold the hinge pins against rotation relative to the blocks. When the blocks are pivotally connected together, and the chain is circulated in the guideway of the cutter bar 10 in the manner shown in Fig. 13, the chain blocks, as they pass around the sprocket, tend to follow the chain drive sprocket 24, and the abutment surfaces 27 and 28 on the projections then engage one another so that the blocks leave the sprocket and re-enter the bar guideway in a well known manner. Thus, inward bending of the chain is prevented and the blocks are effectively stripped from the sprocket.

Evidently, instead of having the opposite rows of sprocket teeth in staggered relation and engaging the opposite sides of different blocks to drive the chain, the rows of teeth may be arranged in transverse alignment, as shown in Fig. 14, so that a pair of teeth may concurrently engage the front surfaces 25 of the tooth-receiving recesses 23 to drive the chain. The staggered tooth construction disclosed is preferred, however, since the staggering of the teeth avoids packing with dirt.

As a result of this invention, an improved cutter chain is provided which is extremely rugged and durable in construction and which operates smoothly and with efficiency. By the provision of the fabricated welded chain block structure, with the recesses for receiving the sprocket teeth at the sides of the block bases, an extremely strong construction is afforded and the packing of dirt in the tooth-receiving recesses is substantially avoided. The novel arrangement of the chain blocks, with the blocks pivoted directly together, reduces buckling of the chain and enables reduction in the power required to drive the chain. By the provision of the bit stops arranged in the novel manner disclosed, with the stop spaces communicating with the tooth-receiving recesses at the sides of the block lugs, packing of dirt in the stop spaces is also substantially reduced. By the improved block construction, block bases of solid cross section are provided, resulting in greater strength. By forming the block bases in separate parts welded together along major portions of their lengths and by welding the block lugs to the upper surfaces of the block bases, extreme ruggedness is attained while the cost of manufacture is maintained at a minimum. Other advantages of the invention will be clearly apparent to those skilled in the art.

While there are in this application specifically described one form and a modification which the invention may assume in practice, it will be understood that this form and modification are disclosed for purposes of illustration and that the invention may be further modified and embodied in various other forms without departing from its spirit or the scope of the appended claims.

What I claim as new and desire to secure as Letters Patent is:

1. In a cutter chain, a chain block having a base provided with side recesses for receiving the teeth of a chain driving sprocket, and a lateral lug having a bit-receiving opening, said block base having an internal recess providing a space beneath said lug and with which said bit-receiving opening communicates, said internal recess having a bottom surface disposed below and spaced from the bottom of said bit-receiving opening to provide a stop for limiting insertive movement of a bit shank received in said lug opening, said tooth-receiving recesses being elongated in a direction toward said lug and communicating with said outer sides of said internal recess and providing side vent openings for discharging dirt from said bit stop space, the front walls of said recesses providing rearwardly facing driving surfaces with which sprocket teeth are engageable and said side vent openings communicating with said side recesses rearwardly of said front recess walls.

2. In a cutter chain, a chain block comprising a base composed of complemental parts having inner plane surfaces secured together at the median line of the block, each of said parts having an inner notch and said notches cooperating to provide an opening when said parts are secured together, a block lug overlying said base-opening and having a bit-receiving opening and the bottom of said lug secured to the outer surfaces of said base parts with said bit-receiving opening communicating with said base opening, and said base opening providing a space within which the inner portion of a cutter bit received in said bit-receiving opening is adapted to project and having a bottom surface lying beneath said lug and spaced from the bottom of said bit-receiving opening to provide a stop for limiting insertive movement of a bit shank received in said lug opening, and said base having recesses at the sides thereof for receiving the teeth of a drive sprocket and said side recesses communicating with the sides of said bit stop space to provide dirt vents for discharging dirt laterally from said space, the front walls of said recesses providing rearwardly facing driving surfaces with which sprocket teeth are engageable, and said dirt vents communicating with said recesses rearwardly of said front recess walls.

3. In a cutter chain, a chain block having a base comprising complemental parts having inner plane surfaces secured together at the central longitudinal vertical plane of the block, said base having side receses adapted to receive the teeth of a drive sprocket, said base being solid in cross section intermediate said side recesses and said complemental base parts having inner recesses which cooperate when said parts are secured together to provide a transverse opening across the upper portion of said base and communicating with the upper portions of said side recesses, and a block lug secured to the upper surface of said base above said transverse opening and having a bit-receiving opening communicating with said transverse opening, and said transverse opening having its bottom surface intermediate said side recesses underlying said bit-receiving opening to provide a stop for limiting insertive movement of a bit shank in said lug opening, the front walls of said recesses providing rearwardly facing driving surfaces engageable by the sprocket teeth and said transverse opening communicating with said side recesses rearwardly of said front recess walls.

4. In a cutter chain, a chain block having a base comprising identically-shaped but opposite handled parts having inner plane surfaces disposable in abutting relation and secured together at the central longitudinal vertical plane of the block, said base parts having upper transverse shelflike portions which when said parts are secured together extend along the major portion of the length of said base and providing an outer plane surface, and a block lug secured to said outer plane surface and having a bit-receiving opening, said base having side recesses for receiving the teeth of a drive sprocket, said recesses having curved front and rear walls and a widened upper curved portion joining the upper sides of said curved walls, said base being solid in cross section intermediate said side recesses and said base parts having notches which cooperate to provide an internal recess beneath said lug with which said bit-receiving opening communicates and having a bottom surface underlying said bit-receiving opening to provide a stop for limiting insertive movement of the bit shank received in said lug opening, and said upper widened portions of said recesses communicating with said internal base recess at the sides of the latter, said front recess walls providing rearward facing driving surfaces engageable by the sprocket teeth and said internal base recess communicating with said widened portions of said side recesses at points spaced outwardly toward said lug from said driving surfaces.

5. In a cutter chain, a chain block comprising a base having transverse end bores adapted to receive hinge pins, and a block lug projecting from said base and having a bit-receiving opening, said base having side recesses intermediate said end bores and adapted to receive the teeth of a driving sprocket, the bottoms of said recesses spaced inwardly from the sides of the block base with the intermediate base portion of solid cross section and the front walls of said recesses providing rearwardly facing driving surfaces engageable by the sprocket teeth, said driving surfaces located rearwardly of the front end bore.

LESTER G. ROLLINS.

References Cited in the file of this patent

UNITED STATES PATENTS

| Number | Name | Date |
|---|---|---|
| 285,651 | Newlove | Sept. 25, 1883 |
| 772,151 | Joy | Oct. 11, 1904 |
| 1,028,893 | Luther | June 11, 1912 |
| 1,308,843 | Davis | July 8, 1919 |
| 1,932,949 | Anderson | Oct. 31, 1933 |
| 1,961,370 | Lee | June 5, 1934 |
| 1,999,193 | Holmes | Apr. 30, 1935 |
| 2,054,386 | Moore | Sept. 15, 1936 |
| 2,058,737 | Stephens | Oct. 27, 1936 |
| 2,107,942 | Holmes | Feb. 8, 1938 |
| 2,139,410 | Jeffrey | Dec. 6, 1938 |
| 2,155,526 | Bowman | Apr. 25, 1939 |
| 2,251,406 | Horrigan | Aug. 5, 1941 |
| 2,305,298 | Lewis | Dec. 15, 1942 |
| 2,398,107 | Morrow | Apr. 9, 1946 |

FOREIGN PATENTS

| Number | Country | Date |
|---|---|---|
| 16,289 | Great Britain | Nov. 18, 1915 |
| 247,678 | Germany | June 5, 1912 |
| 436,996 | Great Britain | Apr. 9, 1937 |